(12) United States Patent
Garner, IV et al.

(10) Patent No.: US 11,907,873 B1
(45) Date of Patent: Feb. 20, 2024

(54) SYSTEMS AND METHODS FOR BUSINESS SYNDICATE GEOLOCATED SKILL MATCHING

(71) Applicant: Wells Fargo Bank, N.A., San Francisco, CA (US)

(72) Inventors: Andrew J. Garner, IV, State Road, NC (US); Chris Theodore Kalaboukis, San Jose, CA (US); Rameshchandra Bhaskar Ketharaju, Hyderabad (IN); Joon Maeng, Newcastle, WA (US); Ramanathan Ramanathan, Bellevue, WA (US); Abhijit Rao, Irvine, CA (US); Andres J. Saenz, Redmond, WA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/147,204

(22) Filed: Jan. 12, 2021

(51) Int. Cl.
*G06Q 10/0631* (2023.01)

(52) U.S. Cl.
CPC .......................... *G06Q 10/063112* (2013.01)

(58) Field of Classification Search
None
See application file for complete search history.

(56) References Cited

U.S. PATENT DOCUMENTS

| | | | |
|---|---|---|---|
| 6,934,379 B2 | 8/2005 | Falcon et al. | |
| 7,805,382 B2 | 9/2010 | Rosen et al. | |
| 8,156,051 B1 | 4/2012 | Shah et al. | |
| 8,712,819 B2 | 4/2014 | Brief et al. | |
| 8,849,685 B2 | 9/2014 | Oden | |
| 9,746,985 B1 * | 8/2017 | Humayun | ............. G06F 16/904 |
| 2003/0154117 A1 | 8/2003 | Willard | |

(Continued)

FOREIGN PATENT DOCUMENTS

| | | | | |
|---|---|---|---|---|
| EP | 3287928 A1 * | 2/2018 | ............. | G06F 16/00 |
| WO | WO-2012061813 A1 * | 5/2012 | ........... | G06F 16/904 |
| WO | WO-2019033157 A1 * | 2/2019 | ..... | G06Q 10/063112 |

OTHER PUBLICATIONS

Miller, Matthew K., and Sandra K. Garrett. "Improving disaster volunteer safety through data collection and skills matching." IIE Annual Conference. Proceedings. Institute of Industrial and Systems Engineers (IISE), 2009. (Year: 2009).*

(Continued)

*Primary Examiner* — Thomas L Mansfield
(74) *Attorney, Agent, or Firm* — Foley & Lardner LLP

(57) ABSTRACT

Systems, methods, and computer-readable media for matching a job to a plurality of workers are described herein. A user device is associated with a worker from the plurality of workers. A processing circuit is structured to receive an electronic request. The electronic request comprises a data set related to the job. The processing circuit is further structured to generate a local disaster data set and a test requirement data set. The processing circuit is further structured to select at least one worker. The processing circuit is further structured to cause a client application deployed to the user device to display an electronic notification comprising at least in part the data set related to the job, a risk level rating, a risk level pay premium corresponding to the risk level rating, and an accept control structured to allow the worker to accept the job.

20 Claims, 9 Drawing Sheets

(56) References Cited

U.S. PATENT DOCUMENTS

| | | | |
|---|---|---|---|
| 2003/0212494 A1* | 11/2003 | Alexander | A62B 99/00 702/5 |
| 2004/0267606 A1 | 12/2004 | Brishke et al. | |
| 2008/0040308 A1* | 2/2008 | Ranganathan | G06F 16/284 |
| 2009/0037225 A1 | 2/2009 | Burchianti et al. | |
| 2010/0049662 A1 | 2/2010 | Price et al. | |
| 2010/0175006 A1* | 7/2010 | Li | G16H 50/80 715/764 |
| 2011/0022879 A1* | 1/2011 | Chavda | G06F 11/0793 714/1 |
| 2013/0054289 A1 | 2/2013 | Sengupta et al. | |
| 2014/0139335 A1* | 5/2014 | Vallaire | G08B 27/001 340/539.13 |
| 2014/0310046 A1* | 10/2014 | Shidfar | G06Q 50/01 705/7.19 |
| 2014/0365390 A1* | 12/2014 | Braun | G06Q 10/00 705/325 |
| 2015/0039357 A1 | 2/2015 | Segal et al. | |
| 2015/0248646 A1 | 9/2015 | Avats | |
| 2015/0248649 A1 | 9/2015 | Avats | |
| 2016/0034647 A1 | 2/2016 | Burchianti et al. | |
| 2016/0104096 A1 | 4/2016 | Ovick et al. | |
| 2017/0011131 A1* | 1/2017 | Li | G06F 16/9566 |
| 2017/0024680 A1 | 1/2017 | Allison et al. | |
| 2017/0039524 A1* | 2/2017 | Avats | G06Q 50/01 |
| 2017/0061392 A1 | 3/2017 | Meza-Guinea et al. | |
| 2017/0116575 A1* | 4/2017 | DeGoler | G06Q 10/1053 |
| 2017/0178210 A1 | 6/2017 | Gazzaz | |
| 2017/0286890 A1 | 10/2017 | Fuessel, Jr. | |
| 2017/0300850 A9 | 10/2017 | Avats | |
| 2017/0300861 A9* | 10/2017 | Avats | G06Q 10/1095 |
| 2018/0174092 A1 | 6/2018 | Adegoke | |
| 2019/0139000 A1 | 5/2019 | Sharpe | |
| 2019/0325541 A1 | 10/2019 | Simpson | |
| 2020/0210961 A1* | 7/2020 | Rosental | G06Q 10/063112 |

OTHER PUBLICATIONS

Verni, Christina. "A hospital system's response to a hurricane offers lessons, including the need for mandatory interfacility drills." Health affairs 31.8 (2012): 1814-1821. (Year: 2012).*

Marinescu, Ioana Elena, Daphné Skandalis, and Daniel Zhao. "Job search, job posting and unemployment insurance during the COVID-19 crisis." Job Posting and Unemployment Insurance During the COVID-19 Crisis (Jul. 30, 2020) (2020). (Year: 2020).*

Giorgi, Gabriele, et al. "COVID-19-related mental health effects in the workplace: a narrative review." International journal of environmental research and public health 17.21 (2020): 7857. (Year: 2020).*

* cited by examiner

SYSTEMS AND METHODS FOR BUSINESS SYNDICATE GEOLOCATED SKILL MATCHING

TECHNICAL FIELD

The present disclosure relates to systems and methods for business syndicate geolocated skill matching.

BACKGROUND

Businesses often have changing requirements regarding the number of employees needed at a time. These changes may be unpredictable due to outside factors, such as economic demand and local regulations. Due to these fluctuations in labor demand, businesses may be lacking workers or may have excess workers at any given time. Accordingly, businesses may wish to implement economies of scale by sharing their employee pools.

When a new or temporary worker joins a business or when an existing worker returns after an absence, the business may be required to ensure that the worker is in compliance with local health ordinances. Some ordinances may require that a worker provide documentation, such as recent epidemiological testing results, before the worker is cleared to work. Such documentation typically includes personal health information (e.g., medical record identifiers, diagnoses unrelated to the test results, medications taken, etc.) that an employee does not need to see to verify test results. If such information is shared with the employer (e.g., by a worker who fails to redact the information from the test results), the employer may need to implement appropriate data protection policies and systems.

SUMMARY

At least one arrangement relates to a computing system for matching a job to a plurality of workers in a business syndicate. The system comprises a user device and a provider computing system. The user device is associated with a worker from the plurality of workers. The provider computing system comprises a network interface and a processing circuit. The network interface is structured to facilitate data communication with the user device via a network. The processing circuit comprises a processor and a memory. The processing circuit is structured to receive an electronic request. The electronic request comprises a first data set related to the job. Based on the first data set, the processing circuit is further structured to generate a local disaster data set and a test requirement data set. The processing circuit is further structured to cause a client application deployed to the user device to generate an image file of a document where the image file of the document comprises a test result. The processing circuit is further structured to receive the image file of the document. The processing circuit is further structured to perform optical character recognition on the image file of the document. The processing circuit is further structured to generate a test result data set. The processing circuit is further structured to verify the test result data set satisfies the test requirement data set. The processing circuit is further structured to receive a second data set related to the plurality of workers in the business syndicate. Based on the second data set, the processing circuit is further structured to generate a location data set, a background data set, and an availability data set. The processing circuit is further structured to select at least one worker from the plurality of workers based on the location data set and the availability data set. The at least one worker associated with the user device. The processing circuit is further structured to transmit a first electronic notification including at least in part, the first data set related to the job and an opportunity to accept the job to the user device. The processing circuit is further structured to cause the client application deployed to the user device, to display a first electronic notification comprising at least in part the first data set related to the job, a risk level rating, a risk level pay premium corresponding to the risk level rating, and an accept control structured to allow the worker to accept the job. The processing circuit is further structured to receive an acceptance of the job from one of the selected plurality of workers. The processing circuit is further structured to transmit to a plurality of user devices associated with the plurality of workers a second electronic notification comprising an electronic indication that the job is no longer available.

Another arrangement relates to a method for matching a job to a plurality of workers in a business syndicate. The method comprises receiving, by a provider institution computing system via a network, an electronic request, the electronic request comprising a first data set related to the job. The method further comprises receiving, by the provider institution computing system via the network, the first data set related to the job. The method further comprises, based on the first data set, generating, by the provider institution computing system, a local disaster data set and a test requirement data set. The method further comprises causing, by the provider institution computing system via the network, a client application deployed to a user device associated with a worker, to generate an image file of a document, the image file of the document comprising a test result. The method further comprises receiving, by the provider institution computing system, performing optical character recognition of the image file of the document. The method further comprises generating, by the provider institution computing system, a test result data set. The method further comprises verifying, by the provider institution computing system, the test result data set satisfies the test requirement data set. The method further comprises receiving, by the provider institution computing system via the network, a second data set related to the plurality of workers in the business syndicate. The method further comprises, based on the second data set, generating, by the provider institution computing system, a location data set and an availability data set. The method further comprises selecting, by the provider institution computing system, at least one worker from the plurality of workers based on the location data set and the availability data set. The at least one worker associated with the user device. The method further comprises transmitting, by the provider institution computing system via the network, a first electronic notification including at least in part, the first data set related to the job and an opportunity to accept the job to the user device. The method further comprises causing, by the provider institution computing system via the network, the client application deployed to the user device, to display a first electronic notification comprising at least in part the first data set related to the job, a risk level rating, a risk level pay premium corresponding to the risk level rating, and an accept control structured to allow the worker to accept the job. The method further comprises receiving, by the provider institution computing system via the network, an acceptance of the job from the user device. The method further comprises transmitting, by the provider institution computing system via the network, to a plurality of user devices associated with the plurality of workers a second electronic notification comprising an electronic indication that the job is no longer available to a remaining selected plurality of workers.

Another arrangement relates to a non-transitory computer readable medium having computer-executable instructions embodied therein that, when executed by at least one processor of a computing system, cause the computing system to perform operations to match a job to a plurality of workers in a business syndicate. The operations comprise receiving an electronic request, the electronic request comprising a first data set related to the job. The operations further comprise receiving the first data set related to the job. The operations further comprise, based on the first data set, generating a local disaster data set and a test requirement data set. The operations further comprise causing a client application deployed to a user device to a worker, to generate an image file of a document. The image file of the document comprising a test result. The operations further comprise receiving the image file of the document. The operations further comprise performing optical character recognition of the image file of the document. The operations further comprise generating a test result data set. The operations further comprise verifying the test result data set satisfies the test requirement data set. The operations further comprise receiving a second data set related to the plurality of workers in the business syndicate. The operations further comprise based on the second data set, generating a location data set and an availability data set. The operations further comprise selecting at least one worker from the plurality of workers based on the location data set and the availability data set. The at least one worker associated with the user device. The operations further comprise transmitting a first electronic notification including at least in part, the first data set related to the job and an opportunity to accept the job to the user device. The operations further comprise causing the client application deployed to the user device, to display a first electronic notification comprising at least in part the first data set related to the job, a risk level rating, a risk level pay premium corresponding to the risk level rating, and an accept control structured to allow the worker to accept the job. The operations further comprise receiving an acceptance of the job from the user device. The operations further comprise transmitting to a plurality of user devices associated with the plurality of workers, a second electronic notification comprising an electronic indication that that the job is no longer available to a remaining selected plurality of workers.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
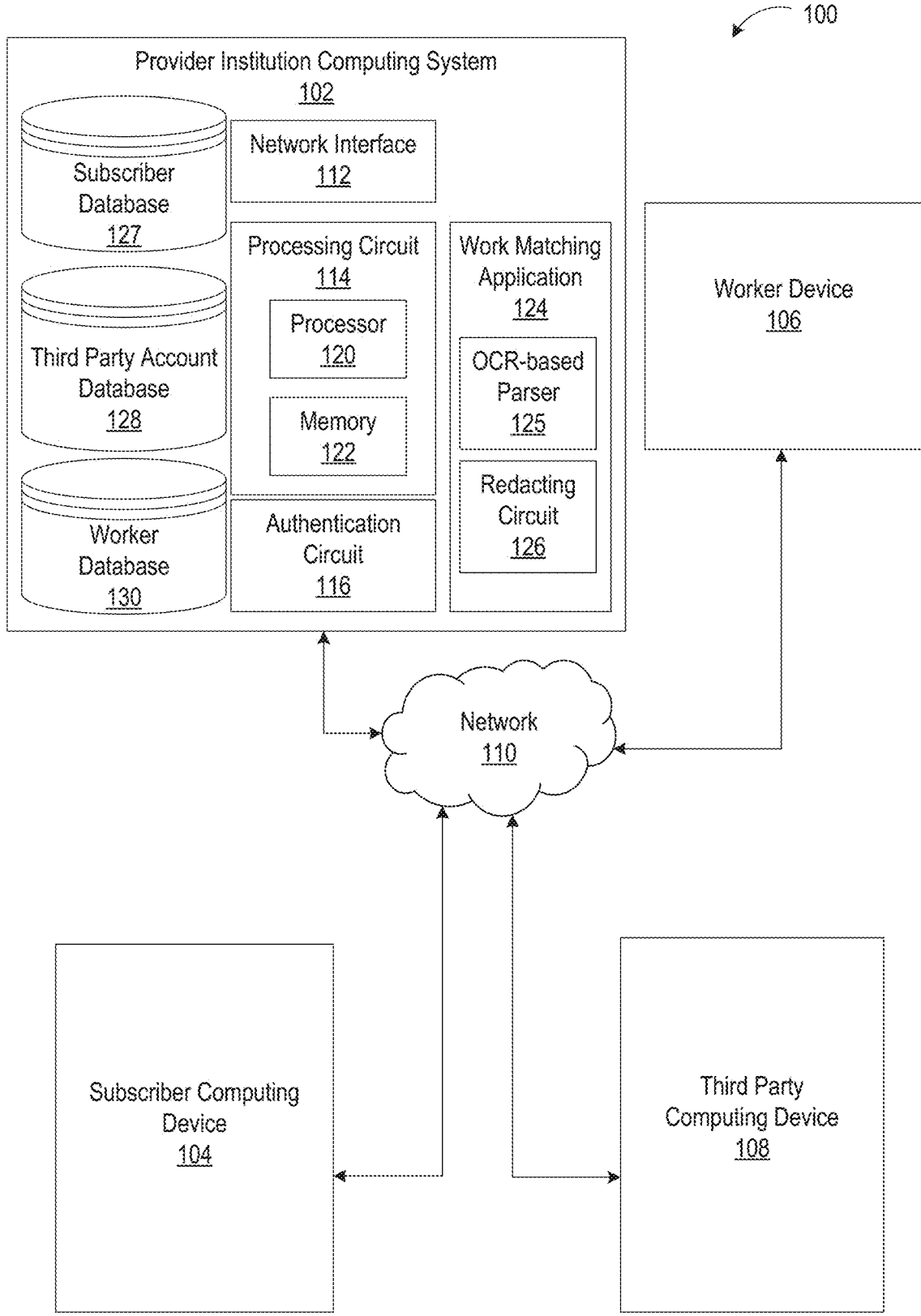
FIG. 1 is a component diagram of a work matching computing system, according to an example arrangement.

Referring generally to the figures, systems and methods for work matching are disclosed. The systems and methods described herein enhance the process of matching workers to jobs by utilizing a geolocation of the worker, receiving local disaster data for a job and by presenting the local disaster data to the worker before accepting the job.

The embodiments of the work matching computing system as described herein improve syndicate-based geolocated work matching technology by performing certain steps that cannot be done by conventional work matching computing systems or human actors. For example, the work matching computing system may generate a risk level rating and provide the risk level rating to the worker. The risk level may be generated on disaster information for a particular locality that corresponds to the location of a pool of available workers (e.g., local ordinances, local epidemiological data (number of reported cases in the locality, testing capacity in a locality), various job properties, such as whether the job requires working indoors, whether the job requires interaction with a number of customers, per hour, that exceeds a predetermined threshold (e.g., 10 customers, 20 customers, 30 customers, 50 customers, etc.), etc.). Accordingly, a health risk rating may be generated and provided to the pool of available workers based on any of the above factors or a combination thereof. The worker may decide on whether to accept the job based on the generated risk level rating. The work matching computing system may also generate a risk level pay premium based on the risk level rating and the types of risks the worker may encounter.

The worker may use the graphical user interfaces (GUI) generated by the systems described herein to specify an individual risk level (e.g., whether the worker will only work outdoors, whether the worker will only work if the business provides particular personal protective equipment (PPE) rated at or above a predetermined safety level (e.g., an N95 respirator or higher), etc.). The work matching computing system may be structured to receive data to pre-screen particular workers before adding them to the pool of available workers. The work matching computing system may be structured to provide a GUI to a particular worker to enter data regarding the worker's most recent epidemiological test results (e.g., COVID-19 test) or to provide an image file, by the worker's computing device (e.g., a cell phone camera), comprising the worker information and test results. Prior to notifying a pool of available workers of a job opportunity or prior to allowing a worker to accept a job, the system may be structured to verify the worker information, the test results, and the date of the test correspond to an individual known to be associated with a particular worker computing device by performing an optical character recognition (OCR)-parser on the received image file. The system may retrievably store device-related information (e.g., IP address, device identifier) and cause the client application on the worker device to include the device-related information in an electronic message that comprises the image file such that the device-related information from the image file may be compared to the stored device information.

The system may be further structured to implement worker privacy-preserving features. For example, the system may include an OCR-based parser structured to recognize that a particular string parsed from the image file is an identifier not used by the system (e.g., a medical records identifier that an employer or prospective employer does not need to know). Accordingly, the OCR-based parser may be structured to discard the string instead of retrievably storing it in the database. In some embodiments, the system may also generate and display on the user device a notification to that effect.

The embodiments of the work matching computing system may utilize geolocation to determine a location of a worker and the location of a job. The utilization of the geolocation improves computer technology in that provides an additional parameter for the work matching computing system for selecting workers and by providing the selected workers additional local disaster information regarding the job. For example, in some embodiments, a provider institution computing system may generate (or cause a remote computing system to generate and transmit to the provider institution computing system) a local disaster data set for a job by using the geolocation of the job. The provider institution computing system may then generate or cause to be generated a risk rating level for the job and to notify the worker of the risk level rating.

Before turning to the figures, which illustrate certain example embodiments in detail, it should be understood that the present disclosure is not limited to the details or methodology set forth in the description or illustrated in the figures. It should also be understood that the terminology used herein is for the purpose of description only and should not be regarded as limiting.

FIG. 1 is a component diagram of a work matching computing system, according to an example arrangement. The work matching computing system 100 may receive electronic requests to create jobs and then creates jobs based on the information received from the electronic request. Further, the work matching computing system 100 may be structured to use the provided information to generate data sets. The work matching computing system 100 may be structured to select from available workers based on the generated data sets and to provide the selected workers at least a portion of the generated data sets.

A business syndicate may include a group of subscribers and workers locally connected to each other. The business syndicate may be a formal organization which includes members responsible for managing and maintaining the business syndicate. In some embodiments, the business syndicate is an informal organization of local subscribers and workers with an agreement to provide support to one another. The members of the business syndicate may pay a periodic fee to remain in the business syndicate. The members of the business syndicate may share resources (e.g., equipment, staff) with other members of the business syndicate. The members of the business syndicate may also have agreements in place to utilize the services of other members of the business syndicate prior to utilizing the services of businesses outside of the business syndicate. The business syndicate may determine the members that may utilize the systems described herein.

A subscriber of the business syndicate may be a local business that provides and/or receives resources to and from the business syndicate. In some embodiments, the subscriber pays a periodic fee to remain as a member of the business syndicate. The subscriber at times may require additional workers to complete a job. The subscriber at times may have additional workers that are not at their working capacity (e.g., are not working full time). The subscriber may utilize the systems described herein, to request and/or provide workers to other members of the business syndicate to more efficiently run their business.

A worker of the business syndicate may be a worker who is staffed by a subscriber of the business syndicate, staffed by a business not associated with the business syndicate, or an independent worker. The worker may pay a periodic fee to remain as a member of the business syndicate. The worker may utilize the systems described herein, to view and accept jobs requested by subscribers of the business syndicate.

A third party may be any information source that provides relevant information utilized by the work matching computing system 100. The third party may be a local municipal website that provides information related to the location of a job and/or the residence of the worker. For example, a local municipal website may provide information related to epidemiological statistics for the location of the job. The third party may also be a business networking platform containing information related to the subscriber and/or the worker. For example, a business networking platform may provide information related to the skill set of a worker by querying the worker's profile on the business networking platform.

As shown, the work matching computing system 100 may include a provider institution computing system 102, a subscriber computing device 104, a worker computing device 106, and a third party computing device 108. The provider institution computing system 102, the subscriber computing device 104, the worker computing device 106, and/or the third party computing device 108 are in communication with each other by a network 110. The provider institution computing system 102 may include a network interface 112, a processing circuit 114, an authentication circuit 116, and a location circuit 118.

As shown, the network interface 112 is structured to establish connections with the subscriber computing device 104 by way of the network 110. The network interface 112 includes programming and/or hardware-based components that connect the provider institution computing system 102 to the network 110. For example, the network interface 112 may include any combination of a wireless network transceiver (e.g., a cellular modem, a Bluetooth transceiver, a Wi-Fi transceiver) and/or a wired network transceiver (e.g., an Ethernet transceiver). In some arrangements, the network interface 112 includes the hardware and machine-readable media structured to support communication over multiple channels of data communication (e.g., wireless, Bluetooth, near-field communication, etc.) Further, in some arrangements, the network interface 112 includes cryptography module(s) to establish a secure communication session (e.g., using the IPSec protocol or similar) in which data communicated over the session is encrypted and securely transmitted.

To support the features of the provider institution computing system 102, the network interface 112 provides a relatively high-speed link to the network 110, which may be any combination of a local area network (LAN), an intranet (e.g., a private banking or retailer network), the Internet, or any other suitable communications network, directly or through another interface.

The processing circuit 114, as shown, comprises a processor 120 and a memory 122. The memory 122 includes one or more memory devices (e.g., RAM, NVRAM, ROM, Flash Memory, hard disk storage) that store data and/or computer code for facilitating the various processes described herein. That is, in operation and use, the memory 122 stores at least portions of instructions and data for execution by the processor 120 to control the processing circuit 114. The memory 122 may be or include tangible, non-transient volatile memory and/or non-volatile memory. The processor 120 may be implemented as a general-purpose processor, an application specific integrated circuit (ASIC), one or more field programmable gate arrays (FPGAs), a digital signal processor (DSP), a group of processing components, or other suitable electronic processing components.

Before receiving a request, the subscriber computing device 104 may be authenticated. The authentication process may include the subscriber completing an authentication process on the subscriber computing device 104 by providing a PIN, passcode, biometric data, etc. and communicating this authentication information to the authentication circuit 116.

The provider institution computing system 102, as shown, is configured to run a variety of application programs and store associated data in a database of the memory 122. One such application may be the work matching application 124. The work matching application 124 includes computer-executable code stored in the memory 122. The work matching application 124 may be structured to receive electronic requests from subscriber computing devices to create jobs. The work matching application 124 may also be structured to select workers according to the details of the jobs and to transmit to the devices associated with the selected workers, an opportunity to accept the job through a notification. According to various embodiments, the notification may include a push alert, a text message, and/or an email message. The notification may be transmitted to the worker computing device 106 via the network 110.

The work matching application 124 may include an OCR-based parser 125. In some embodiments, the provider institution computing system 102 may be structured to receive data to pre-screen particular workers before adding them to the pool of available workers. For example, in some embodiments, the system may be structured to provide a GUI for a particular worker to enter data regarding the worker's most recent epidemiological test results (e.g., COVID-19 test).

The GUI may be structured to allow a worker to invoke a camera coupled or integrated into the worker computing device 106 (e.g., a cell phone camera). The OCR-based parser 125 may receive an image file comprising worker information and test results. In some embodiments, the system may be structured to verify that the test results correspond to an individual known to be associated with a particular worker computing device. For example, in some embodiments, the provider institution computing system 102 may retrievably store device-related information (e.g., IP address, device identifier) and cause the client application on the device to include the device-related information in an electronic message that comprises the image file such that the device-related information from the image file may be compared to the stored device information. The OCR-based parser 125 may be structured to extract from the image file worker information (e.g., worker name) and test results (e.g., disease tested for, test date, status (positive or negative), confidence level). In some embodiments, the system is structured to retrievably store this information in a database and verify, prior to notifying a pool of available workers of a job opportunity or prior to allowing a worker to accept a job, that the test status is negative and that the test date is within a predetermined date range (e.g., 1 month, 2 weeks, 1 week, 5 days, 3 days, 2 days, 1 day) from the job's start date. In some embodiments, the system is structured to implement worker privacy-preserving features. For example, the OCR-based parser 125 may be structured to recognize that a particular string parsed from the image file is an identifier not used by the system (e.g., a medical records identifier). For example, it can be determined if the string is an identifier if the string contains at least a numerical, alphabetical, or alphanumeric combination of a predetermined number of characters in length (e.g., three or more, five or more) that cannot be found in an electronic language dictionary retrievably stored in the database associated with the system. In another example, the OCR-based parser 125 may be structured to actively identify a string to then omit that information. For example, the string may determine a string containing at least a numerical, alphabetical, or alphanumeric combination of a predetermined number of characters identifying the race of the worker, the OCR-based parser 125 may then omit the system from storing that information. Accordingly, the OCR-based parser 125 may be structured to discard the string instead of retrievably storing it in the database. In some embodiments, the system may also generate and display on the user device a notification to that effect.

The work matching application 124 may also include a redacting circuit 126. The redacting circuit 126 may receive, by the OCR-based parser 125, recognized identifiers in the image file not used by the system. The redacting circuit 126 may then generate means to redact the recognized identifiers. In some embodiments, the redacting circuit 126 redacts the recognized identifiers by generating a black box or applies a filter overlaid onto the recognized identifiers. In other embodiments, the redacting circuit 126 crops out the portion of the image file containing the recognized identifiers. After the redacting circuit 126 redacts this information, the provider institution computing system 102 may then retrievably store the redacted image file.

The provider institution computing system 102 may also include a subscriber database 127, a third party account database 128, and a worker database 130. If the provider institution computing system 102 receives an electronic request from the subscriber computing device 104, the electronic request may include a first data set. The provider institution computing system 102 may use the first data set to generate various data sets. The various data sets may include, but is not limited to, a location of the job, a duration of the job, a required skill set to complete the job, a tool set required for the job, and a payment amount for the job. The provider institution computing system 102 may store the various data sets in the subscriber database 127. For example, the provider institution computing system 102 may receive an electronic request from the subscriber computing device 104 to create a job.

The provider institution computing system 102 may also utilize the various data sets to generate a local disaster data set. The local disaster data set may be any information that may impact the decision to accept a job by the worker. The provider institution computing system 102 may store the local disaster data set in the third party account database 128. The provider institution computing system 102 may utilize the local disaster data sets to generate a risk level rating. The risk level rating may provide the worker detailed information of the likelihood of risk before accepting a job.

The local disaster data set may include information related to local epidemiological information (e.g., local number of individuals infected with influenza, local number of individuals infected with COVID-19). For example, the provider institution computing system 102 may utilize the address of the job included in the first data set to determine the local epidemiological information. The provider institution computing system 102 may communicate with the third party computing device 108 and transmit to the third party computing device 108 the address for the job. The third party computing device 108 may then transmit the local epidemiological information to the provider institution computing system 102. The provider institution computing system 102 may then generate a risk level rating based on the transmitted information.

The local disaster data set may also include information related to the likelihood of making contact with infected individuals based on the job description (e.g., jobs in or near hospitals). For example, the provider institution computing system 102 may utilize the job description included in the first data set to determine the likelihood of making contact with infected individuals. The provider institution computing system 102 may communicate with the third party computing device 108 and transmit to the third party computing device 108 the job description. The third party computing device 108 may then transmit the likelihood of making contact with infected individuals to the provider institution computing system 102. The provider institution computing system 102 may then generate a risk level rating based on the transmitted information.

The local disaster data set may also include information related to the likelihood of a natural disaster (e.g., jobs to be completed during hurricane season) based on the address of the job. For example, the provider institution computing system 102 may utilize the address of the job included in the first data set to determine what the likelihood of a natural disaster may be for the area surrounding the address of the job. The third party computing device 108 may then transmit the likelihood of a natural disaster to the provider institution computing system 102. The provider institution computing system 102 may then generate a risk level rating based on the transmitted information.

The local disaster data set may also include information related to the likelihood of injury (e.g., construction jobs on unfinished high-rises, welding jobs at oil refineries) based on the job description. For example, the provider institution computing system 102 may utilize the job description included in the first data set to determine the likelihood of injury. The provider institution computing system 102 may communicate with the third party computing device 108 and transmit to the third party computing device 108 the job description. The third party computing device 108 may then transmit the likelihood of injury to the provider institution computing system 102. The provider institution computing system 102 may then generate a risk level rating based on the transmitted information.

The risk level rating may be generated by including various local disaster data sets. The risk level rating may include, but is not limited to the various local disaster data sets described above. For example, a nurse will likely have a higher likelihood of making contact with infected individuals. A nursing job in an area with a high local infection rate may result in a much high risk level rating than a nursing job in an area with a low local infection rate. The provider institution computing system 102 may provide the worker the causes of a high risk level rating for a job.

The risk level rating may be generated and transmitted to the user of the worker computing device 106 through various methods. The risk level rating may be conveyed through a color scheme displayed via a GUI rendered to a display of a computing device. For example, an orange risk level rating may have a larger risk level rating than a yellow risk level rating. The risk level rating may be conveyed through a quantitative metric. For example, a risk level rating of 4.5 may be interpreted that there is a very high chance of injury to perform the job. The risk level rating may be conveyed through a description. For example, a risk level rating may state that a job has a "high chance of encountering of an infected individual."

The provider institution computing system 102 may utilize the risk level rating to generate a risk level pay premium. The risk level pay premium is an amount that is added to the payment amount for a job. The larger a risk level rating is may result in a higher risk level pay premium. The risk level pay premium may be generated by assigning a specific amount per the risk level rating. For example, the provider institution computing system 102 may always add 30% or another predetermined percentage of the payment amount for completing a job to the payment amount when the risk level rating is considered very high.

The risk level pay premium may be generated by considering the various local disaster data sets that cause the risk level rating. For example, the provider institution computing system 102 may generate a higher risk level pay premium if the cause of a high risk level rating is due to a higher likelihood of making contact with infected individuals compared to the likelihood of injury due to the nature of the job.

The risk level pay premium may be communicated to the subscriber computing device 104 before the job is created to allow the user of the subscriber computing device 104 to agree to the risk level pay premium. In some embodiments, the subscriber computing device 104 may also assign the risk level pay premium for a job.

The provider institution computing system 102 may then receive information related to a plurality of workers in a business syndicate. The information related to the plurality of workers in the business syndicate may include a second data set. The second data set may be transmitted by the worker computing device 106 associated with at least some of the plurality of workers. A portion of the second data set may also be retrieved from the worker database 130.

The provider institution computing system 102 may utilize the second data set to generate various data sets related to the plurality of workers. The various data sets may include, but are not limited to, a location data set, an availability data set, a work skill data set, a rating value data set, and a personalized data set. The personalized data set may include, but is not limited to, additional information regarding the workers such as special conditions, disability information, minimum required payment, maximum job duration. The provider institution computing system 102 may store the various data sets in the worker database 130.

The provider institution computing system 102 may utilize the generated various data sets set to select from the plurality of workers. The provider institution computing system 102 may utilize the geolocation of the worker to determine whether they are in proximity of the job location. For example, the provider institution computing system 102 may only select workers within ten miles of the address of the job. The provider institution computing system 102 may utilize the skill set of the worker to determine whether they meet the requirements for the job. For example, the provider institution computing system 102 may only select workers with experience with hanging dry wall for jobs with jobs descriptions for hanging dry wall. The provider institution computing system 102 may also utilize the third party computing device 108 to receive information related to the skill set of the worker. For example, the provider institution computing system 102 may receive the work experience of a worker by querying a business networking platform associated with the worker. After completion of the job, the skill set for the selected worker may be updated to include the experience received during the completion of the job.

The provider institution computing system 102 may categorize various skill sets into various classifications. The classifications may be based on the work experience of the worker. For example, if a worker has several years of experience hanging drywall, but only a year of experience painting, the provider institution computing system 102 may categorize that worker's skill to hang drywall to be the worker's primary skill and painting to be a secondary or tertiary skill. The classifications may be based on determining similar skills compared to the work experience of the worker. For example, if a worker has several years of experience painting home interiors as a primary skill, the provider institution computing system 102 may also assign painting wooden decks as a secondary skill for the worker.

The provider institution computing system 102 may utilize the classifications when matchmaking workers to specific jobs. For example, if a subscriber creates a job to hang drywall as the primary task, but has a preference for the same worker to also paint the drywall after installation, the provider institution computing system 102 may prioritize workers that have hanging drywall as a primary skill and painting as an additional skill.

This feature may be especially useful in situations where the subscriber wants to minimize the number of workers at a site. These situations may include, but are not limited to, pandemic scenarios, epidemic scenarios, safety concerns, and/or social scenarios. For example, in an epidemiological scenario, there is a need to minimize the number of workers at a hospital for the safety of the worker, the hospital employees, and patients. In these scenarios, when a job requires several skills, the provider institution computing system 102 prioritizes workers who have all of the required skills. The provider institution computing system 102 may adjust other searching parameters to search for workers with the required skills. For example, when the subscriber specifies that a job requires a worker with several skills, the searching distance may be increased by the provider institution computing system 102 to search for a worker with the required skills.

The provider institution computing system 102 may also prioritize workers having the required skills to complete multiple jobs at the same site. For example, if a hospital requires drywall to be installed in one room and for another room to be painted, the provider institution computing system 102 may provide a worker that can hang drywall and paint both job opportunities before providing the job opportunities to other workers.

The provider institution computing system 102 may also utilize the classifications to determine the payment amount for a job. For example, a subscriber may develop a rate card (e.g., a fixed hourly rate based on the required skill to complete a job) so that each classified skill has a base hourly rate. The subscriber may provide the rate card to the provider computing system 102. The provider institution computing system 102 may utilize the rate card to determine the payment amount for a job based on the required skills necessary to complete the job. For example, if a job is primarily directed to hanging dry wall, but also requires paint touch-ups, the provider institution computing system 102 may generate a payment amount based on the time completed to hang drywall and the time required to complete the perform the paint touch-ups.

The provider institution computing system 102 may also utilize the rating value of the worker to determine if they meet a minimum value required by the subscriber. For example, the provider institution computing system 102 may only select those with at least a 4.0 rating value out of 5.0 if required by the subscriber. The rating value of the worker may be utilized to provide a pay premium for the worker's completion of the job. After completion of the job, the rating value for the worker may be updated to include a rating value provided by the subscriber. The provider institution computing system 102 may also prefer workers that have completed work for the subscriber in the past. If a subscriber provides a positive rating value for a worker's past experience with that subscriber, the provider institution computing system 102 may prefer to select that worker for future jobs for that subscriber.

The provider institution computing system 102 may also utilize the availability of the worker to determine if they are available to perform the job. The availability of the worker may be provided by the primary employer of the worker. For example, if a restaurant is planning on being inoperable for a week due to renovations, the availability data set for the worker may be updated to reflect that the worker is available during that week.

The provider institution computing system 102 may utilize any and/or all of the generated various data sets to select from the plurality of workers. The selection may place specific data sets to be more valuable than other data sets. For example, the provider institution computing system 102 may only select from the plurality of workers within 5 miles of the job. The provider institution computing system 102 may then prioritize workers from the plurality of workers who have the most applicable skill set for the job.

After selecting from the plurality of workers, the provider institution computing system 102 may transmit a first electronic notification to the selected plurality of workers. According to various embodiments, the first electronic notification may include a push alert, a text message, and/or an email message. The first electronic notification may be transmitted to the worker computing device 106 via the network 110. The first electronic notification may include some of the information of the first data set. The first electronic notification may also include some of the generated data sets including, but not limited to, the local disaster data set, the risk level rating, and the risk level premium. The users of the worker computing device 106 may then accept or reject the offer of the job. The users of the worker computing device 106 may also include additional information to be shared with the subscriber computing device 104. The users of the worker computing device 106 may also request an additional payment amount. The worker computing device 106 then transmits the response to the provider institution computing system 102.

The provider institution computing system 102 may then transmit the information from the plurality of workers that accepted the job to the subscriber computing device 104. The user of the subscriber computing device 104 may then select a desired number of workers from the plurality of workers that accepted the job. The subscriber computing device 104 transmits the response to the provider institution computing system 102. After receiving the response from the subscriber computing device 104, the provider institution computing system 102 may transmit a second electronic notification to the selected plurality of workers. According to various embodiments, the second electronic notification may include a push alert, a text message, and/or an email message. The second electronic notification may include whether the worker has been chosen for the job or not. If chosen, the second electronic notification may provide additional instructions to the user of the worker computing device 106. The provider institution computing system 102 may then update the availability data set for the worker computing device 106 to mark them unavailable during the duration of the job.

After the completion of the job, the provider institution computing system 102 may generate a tax form. The tax form may be an electronic form and may be transmitted to the worker, the subscriber, and/or the business syndicate. The tax form may include, but is not limited to, the job description, the name of the subscriber, the payment amount, the name of the worker, and the address of the worker.

After the completion of the job, the subscriber computing device 104 may transfer an electronic payment for completing the job from a subscriber financial account associated with a financial account associated with the worker. In some embodiments, the subscriber computing device 104 may transfer the electronic payment from the subscriber financial account to an escrow account associated to the business syndicate. The subscriber computing device 104 may transfer the electronic payment to the escrow account associated with business syndicate after the completion of the job. In some embodiments, the subscriber computing device 104 may transfer the electronic payment to the escrow account associated to the business syndicate before or during the completion of the job. The escrow account associated to the business syndicate may then transfer the electronic payment to the worker. In some embodiments, the electronic payment is transferred to a financial account of a primary employer of the worker.

Figure 2:
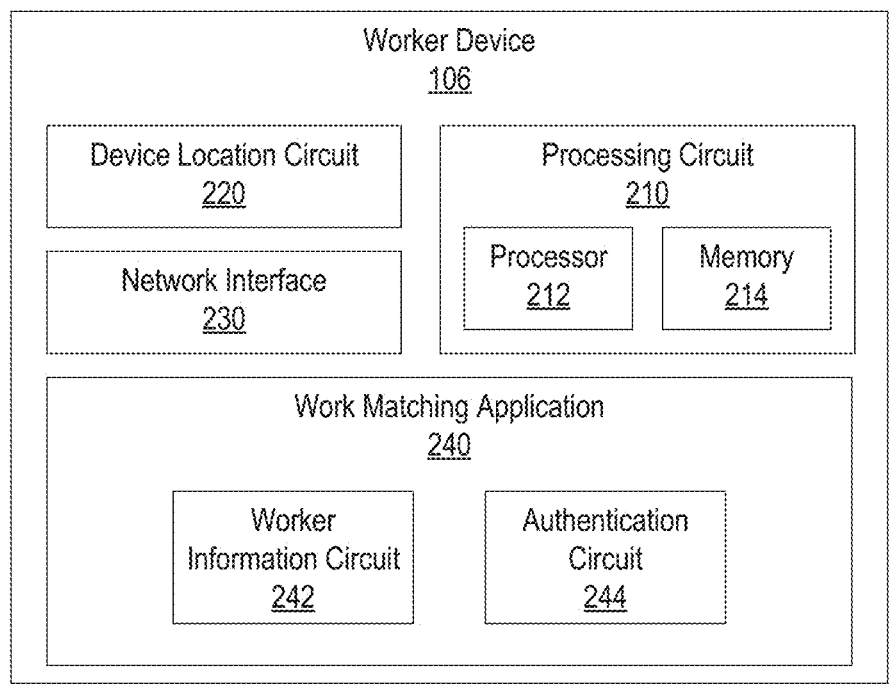
FIG. 2 is a component diagram of a worker computing device, according to an example arrangement.

FIG. 2 is a component diagram of a worker computing device 106, according to an example arrangement. The worker computing device 106 includes a processing circuit 210, a device location circuit 220, a network interface 230, and a work matching application 240. The processing circuit 210 as shown, comprises a processor 212 and a memory 214. The memory 214 includes one or more memory devices (e.g., RAM, NVRAM, ROM, Flash Memory, hard disk storage) that store data and/or computer code for facilitating the various processes described herein. That is, in operation and use, the memory 214 stores at least portions of instructions and data for execution by the processor 212 to control the processing circuit 210. The memory 214 may be or include tangible, non-transient volatile memory and/or non-volatile memory. The processor 212 may be implemented as a general-purpose processor, an application specific integrated circuit (ASIC), one or more field programmable gate arrays (FPGAs), a digital signal processor (DSP), a group of processing components, or other suitable electronic processing components.

The device location circuit 220 is configured to determine the location of the worker computing device 106 and provide the location of the worker computing device 106 to other entities (e.g., the provider institution computing system 102) via the network interface 230. The device location circuit 220 determines the location of the worker computing device 106 based on the Global Positioning System ("GPS") coordinates of the worker computing device 106. The device location circuit 220 may be a GPS receiver. In some arrangements, the device location circuit 220 may be in communication with a GPS receiver of the worker computing device 106. The device location circuit 220 may determine the GPS location of the worker computing device 106 based on GPS signals received from GPS satellites.

The network interface 230 is configured for and structured to communicate data over the network 110. For example, the network interface 230 is configured for and structured to send and receive information related to a job initiated by the subscriber. Accordingly, the network interface 230 includes any of a cellular transceiver (for cellular standards), local wireless network transceiver (for 802.11X, ZigBee, Bluetooth, Wi-Fi, or the like), wired network interface, a combination thereof (e.g., both a cellular transceiver and a Bluetooth transceiver), and/or the like.

The work matching application 240 is software that may be configured to run on a mobile device or other computing device (e.g., the worker computing device 160). The work matching application 240 is configured to provide data for the work matching computing system 100, receive information related to an available job and to provide a response to available jobs. The work matching application 240 includes a worker information circuit 242 and an authentication circuit 244.

The worker information circuit 242 is configured to access information regarding the information of the user of the worker computing device 106 to the provider institution computing system 102. For example, the worker information circuit 242 communicates with the provider institution computing system 102 to provide the skill set of the worker. In some arrangements, the worker information circuit 242 is structured to provide a GUI structured to allow a user to invoke a camera of the worker computing device 106 via a selectable control. Another GUI may include information visible in a viewfinder of the camera, such as a printout of the worker's epidemiological test results. Once a user causes the camera to capture an image of the viewfinder contents, the worker information circuit 242 may invoke an OCR-based parser, which may be installed locally or delivered to the worker computing device 106 to perform data scrubbing operations. The OCR-based parser may perform OCR on the image content. The OCR-based parser may further identify information not needed for the purpose of matching the worker to a job, such as personal health information not related to epidemiological test results, diagnostic codes, CPT codes, medical records numbers, etc. The OCR-based parser may remove these data values from a data set of values parsed from the image and submit only the necessary information to the provider institution computing system 102 (e.g., name, date of birth, test description, test date, test method, test result, test provider institution). In some arrangements, the worker information circuit 242 is configured to transmit device information to the provider institution computing system 102.

The authentication circuit 244 is configured to receive an authentication code from the provider institution computing system 102 and provide the authentication code for verification of the worker. In arrangements where the authentication code is encrypted, the authentication circuit 244 is configured to decrypt the authentication code when providing the authentication code for verification purposes. In some arrangements, the authentication circuit 244 is configured to transmit device information to the provider institution computing system 102.

Figure 3:
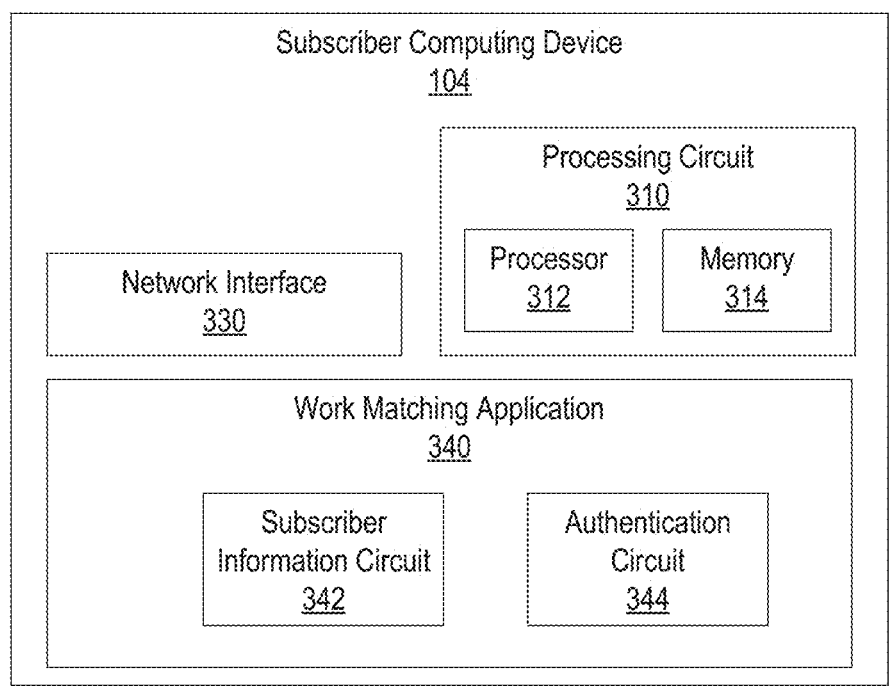
FIG. 3 is a component diagram of a subscriber computing device, according to an example arrangement.

FIG. 3 is a component diagram of a subscriber computing device 104, according to an example arrangement. The worker computing device 106 includes a processing circuit 310, a network interface 330, and a work matching application 340. The processing circuit 310 as shown, comprises a processor 312 and a memory 314. The memory 314 includes one or more memory devices (e.g., RAM, NVRAM, ROM, Flash Memory, hard disk storage) that store data and/or computer code for facilitating the various processes described herein. That is, in operation and use, the memory 314 stores at least portions of instructions and data for execution by the processor 312 to control the processing circuit 310. The memory 314 may be or include tangible, non-transient volatile memory and/or non-volatile memory. The processor 312 may be implemented as a general-purpose processor, an application specific integrated circuit (ASIC), one or more field programmable gate arrays (FPGAs), a digital signal processor (DSP), a group of processing components, or other suitable electronic processing components.

The network interface 330 is configured for and structured to communicate data over the network 110. For example, the network interface 330 is configured for and structured to send and receive information related to a job initiated by the subscriber. Accordingly, the network interface 330 includes any of a cellular transceiver (for cellular standards), local wireless network transceiver (for 802.11X, ZigBee, Bluetooth, Wi-Fi, or the like), wired network interface, a combination thereof (e.g., both a cellular transceiver and a Bluetooth transceiver), and/or the like.

The work matching application 340 is software that may be configured to run on any computing device, mobile device, or any other computing device (e.g., the subscriber computing device 104). The work matching application 340 is configured to provide data for the work matching computing system 100, provide information related to a requested job and to provide a response for selecting workers. The work matching application 340 includes a subscriber information circuit 342 and an authentication circuit 344.

The subscriber information circuit 342 is configured to access information regarding the information related to the electronic request to the provider institution computing system 102. For example, the subscriber information circuit 342 communicates with the provider institution computing system 102 to provide the required skill set for the job, a location for the job, a description of duties, job date(s), hours, epidemiological testing requirements, etc.

The authentication circuit 344 is configured to receive an authentication code from the provider institution computing system 102 and provide the authentication code for verification of the subscriber. In arrangements where the authentication code is encrypted, the authentication circuit 344 is configured to decrypt the authentication code when providing the authentication code for verification purposes.

Figure 4:
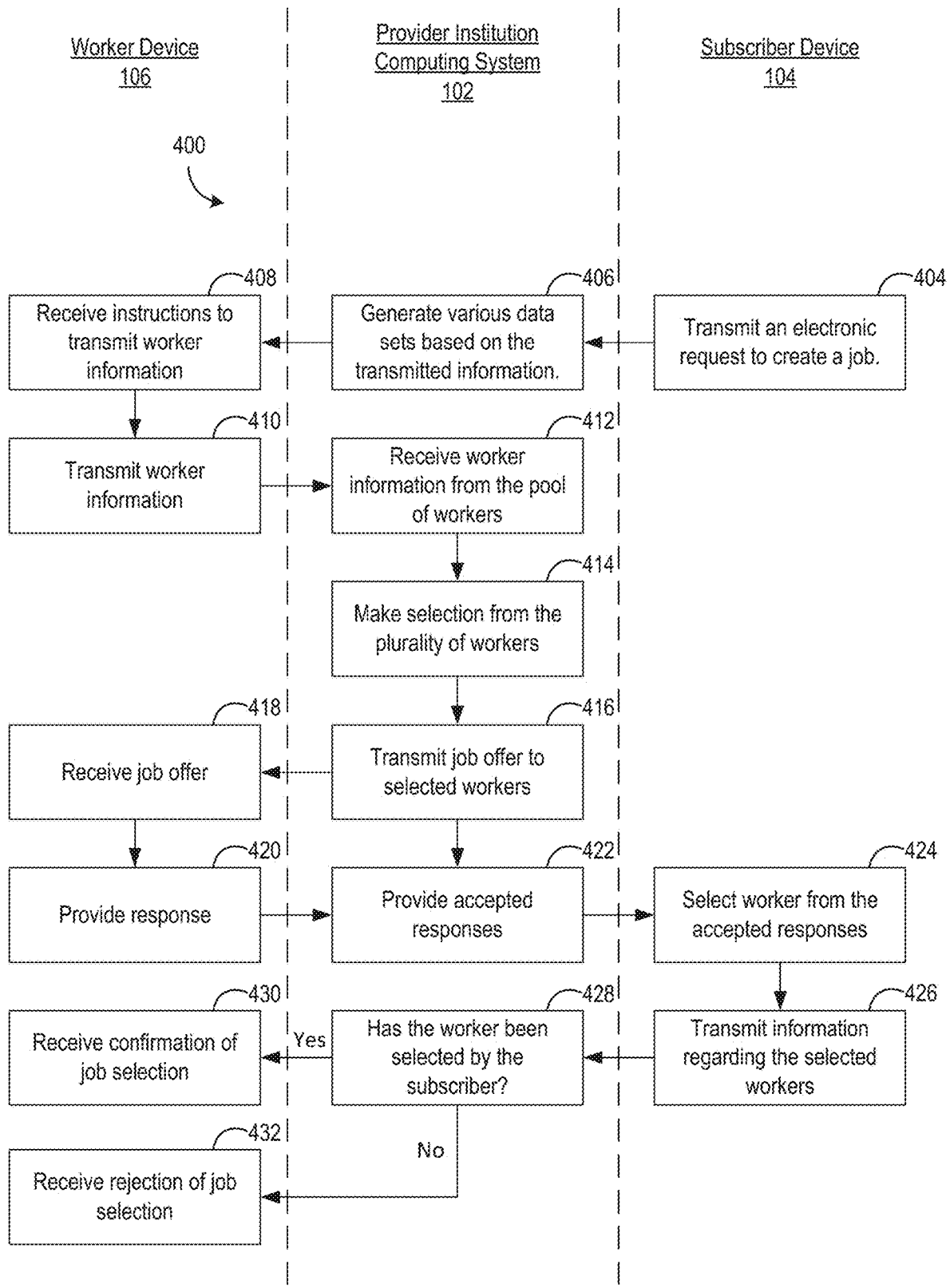
FIG. 4 is a flow diagram of a method executed by the work matching computing system, according to an example arrangement.

FIG. 4 is a flow diagram of a method 400 executed by the work matching computing system, according to an example arrangement. Operations of the method 400 may be conducted by the work matching computing system 100 (e.g., provider institution computing system 102, subscriber computing device 104, and worker computing device 106). Through operations of the method 400, the provider institution computing system 102 receives an electronic request from the subscriber computing device 104, generates various data sets based on the electronic request, transmits a job request to a worker computing device 106, and subsequently receives further transaction information from the subscriber computing device 104 and the worker computing device 106.

As shown, the method 400 begins by the user of the subscriber computing device 104 transmitting to the provider institution computing system 102, an electronic request to create a job at step 404. The subscriber may be a part of a local business syndicate searching for workers also in the business syndicate. In some embodiments, the subscriber and/or the workers may not be members of a business syndicate.

Further, the provider institution computing system 102 may receive the first data set in the electronic request by the subscriber computing device 104 at step 406. The provider institution computing system 102 may generate various data sets from the first data set. The various data sets may include the local disaster data set. The various data sets may also include, but is not limited to, a location of the job, a duration of the job, a required skill set to complete the job, a tool set required for the job, and a payment amount for the job.

Further, the worker computing device 106 receives instructions from the provider institution computing system 102 to transmit worker information at step 408. The worker computing device 106 may first notify the user of the worker computing device 106 of the instructions by the provider institution computing system 102. The user of the worker computing device 106 may then decide whether to provide the worker information.

Further, the worker computing device 106 transmits the worker information to the provider institution computing system 102 at step 410. The worker information may include the second data set. The second data set may include, but is not limited to, the worker's location, the worker's availability, the worker's work experience, and personalized information. The personalized information may include, but is not limited to, additional information regarding the workers such as special conditions, disabilities, minimum required payment, maximum job duration.

Further, the provider institution computing system 102 may receive the second data set at step 412. The provider institution computing system 102 may generate various data sets from the second data set. The various data sets may include, but is not limited to, a location data set, an availability data set, a work skill data set, a rating data set, and a personalized data set.

Further, the provider institution computing system 102 may select from the plurality of worker at step 414. The provider institution computing system 102 may select from the plurality of worker by comparing the job requirements generated by the first data set to the various data sets generated by the second data. For example, the provider institution computing system 102 may utilize the location of the worker, generated by the second data set, to determine what the worker's distance from the job location, generated by the first data set. The provider institution computing system 102 may then only select from the plurality of workers within a specified proximity from the job location.

Further, the provider institution computing system 102 may then transmit a job offer to the selected worker's worker computing device 106 at step 416. The job offer may include at least in some of the various data sets generated from the first data set. The various data sets may include the local disaster data set, the risk level rating, and/or the risk level pay premium.

Further, the worker computing device 106 may receive the job offer at step 418. The worker computing device 106 may receive the job offer through a first electronic notification. The first electronic notification may include a push alert, a text message, and/or an email message. The first electronic notification may include some of the information of the first data set. The first electronic notification may also include the generated data sets including, but not limited to, the local disaster data set, the risk level rating, and the risk level premium. The users of the worker computing device 106 may then accept or reject the offer of the job.

Further, the worker computing device 106 may provide a response at step 420. The user of the worker computing device 106 may accept or reject the job offer. The user of the worker computing device 106 may also include additional information to be shared with the subscriber computing device 104. The user of the worker computing device 106 may also request an additional payment amount.

Further, the provider institution computing system 102 may receive the responses at step 422. The provider institution computing system 102 may then transmit the accepted responses to the subscriber computing device 104. The transmission may include the various data sets generated from the second data set for each of the workers that accepted the offer.

Further, the subscriber computing device 104 may receive the accepted responses and the various data sets generated from the second data set at step 424. The provider institution computing system 102 may omit transmitting some of the various data sets regarding the worker that is not needed by the subscriber (e.g., worker's ethnicity, personal health information, etc.).

Further, the subscriber computing device 104 may transmit which workers were selected from the workers at step 426. The subscriber computing device 104 may provide the provider institution computing system 102 which workers have been selected by the user of the subscriber computing device 104. The subscriber computing device 104 may also provide additional instructions for the workers (e.g., tools to bring, parking instructions).

Further, the provider institution computing system 102 may transmit a second electronic notification to the workers that accepted the job offer at step 428. The provider institution computing system 102 receives which workers were selected from the subscriber computing device 104. According to various embodiments, the second electronic notification may include a push alert, a text message, and/or an email message. The second electronic notification may include whether the worker has been chosen for the job or not.

Further, the selected users of the worker computing device 106 receive confirmation of being selected for the job at step 430. The selected users of the worker computing device 106 may receive the second electronic notification confirming they have been selected. The second electronic notification may also include additional instructions to the user of the worker computing device 106 provided by the subscriber computing device 104. The provider institution computing system 102 may update the availability data set for the worker computing device 106 to mark them unavailable during the duration of the job.

Further, the rejected users of the worker computing device 106 receive confirmation of being rejected for the job at step 432. The rejected users of the worker computing device 106 may receive the second electronic notification stating they have not been selected for the job.

Figure 5:
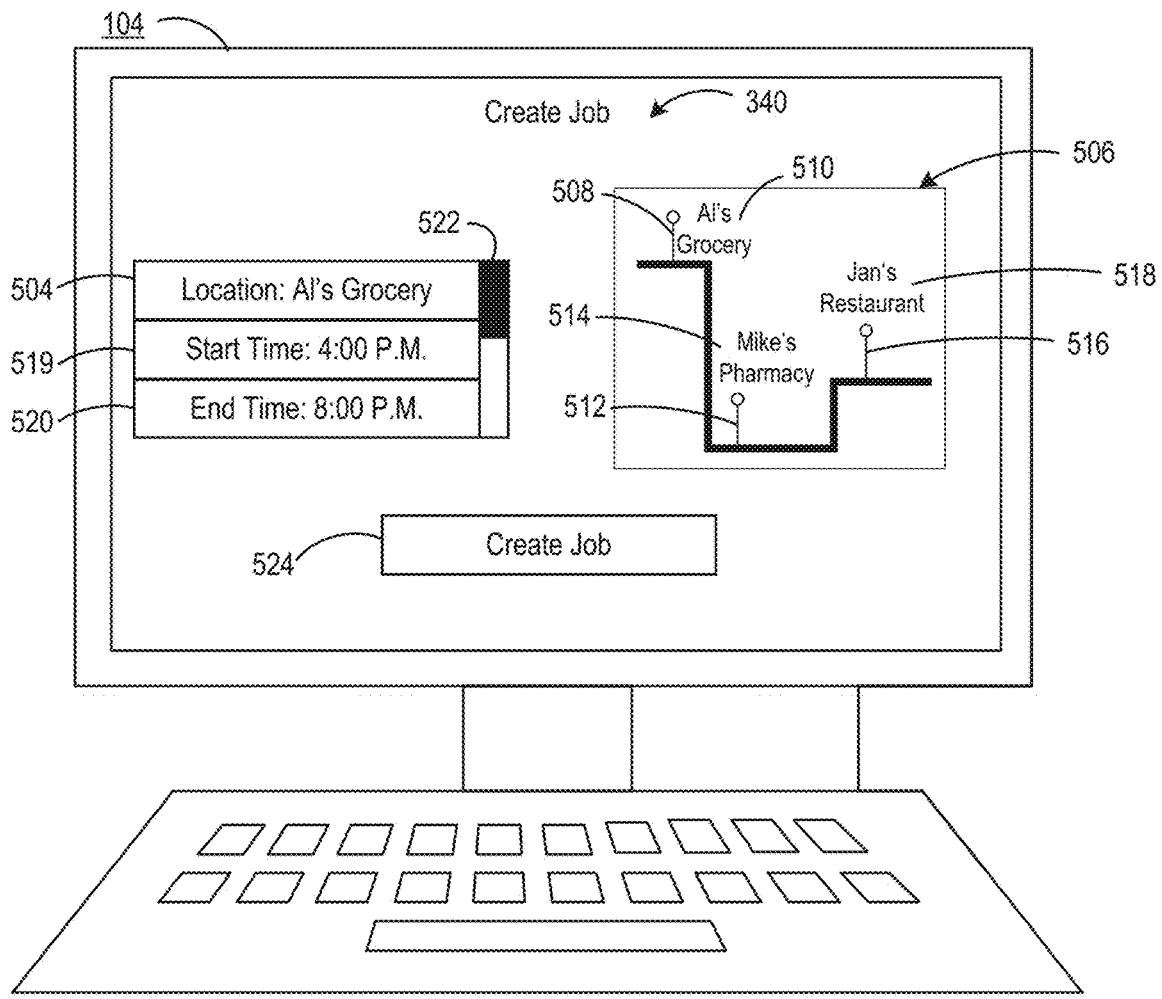
FIG. 5 is an illustration of some aspects of a user interface for creating a job on a subscriber computing device, according to an example arrangement.

Referring to FIG. 5, an illustration of some aspects of a user interface for creating a job on a subscriber computing device, according to an example arrangement. The user interface may display the work matching application 340 and/or transaction information which may be directed to creating a job. The transaction information includes a job written location 504 and a job map 506. The user of the subscriber computing device 104 may input the location in the job written location 504. The user of the subscriber computing device 104 may also input the location by utilizing the job map 506. The job map 506 may allow the user of the subscriber computing device 104 to select a location on the job map 506. Using GPS coordinates of the subscriber computing device 104, the job map 506 may include a current location and the current location descriptor. For example, the job map 506 may include a location for Al's Grocery 508 and a descriptor "Al's Grocery" 510 if the user of the subscriber computing device 104 is currently within a specified proximity of Al's Grocery.

Using data available to the subscriber computing device 104, the job map 506 may include previously used locations. For example, the job map 506 may include a location for Mike's pharmacy 512 and a descriptor "Mike's Pharmacy" 514 if the user of the subscriber computing device 104 has recently created a job for Mike's Pharmacy.

The subscriber computing device 104 may also allow for the user of the subscriber computing device 104 to select a location on the job map 506. For example, the job map 506 may include a location for Jan's Restaurant 516 and a descriptor "Jan's Restaurant" 518 if the user of the subscriber computing device 104 selects Jan's Restaurant on the job map 506.

The transaction information further includes a job start time 519, a job end time 520, a scrolling bar 522, and a create job 524. The user of the subscriber computing device 104 may utilize the scrolling bar 522 to add additional information for the job. Once the user of the subscriber computing device 104 has completed filling out the information for the job, the user of the subscriber computing device 104 may select the create job 524. Selecting to the create job 524 results in the electronic request being sent to the provider institution computing system 102.

Figure 6:
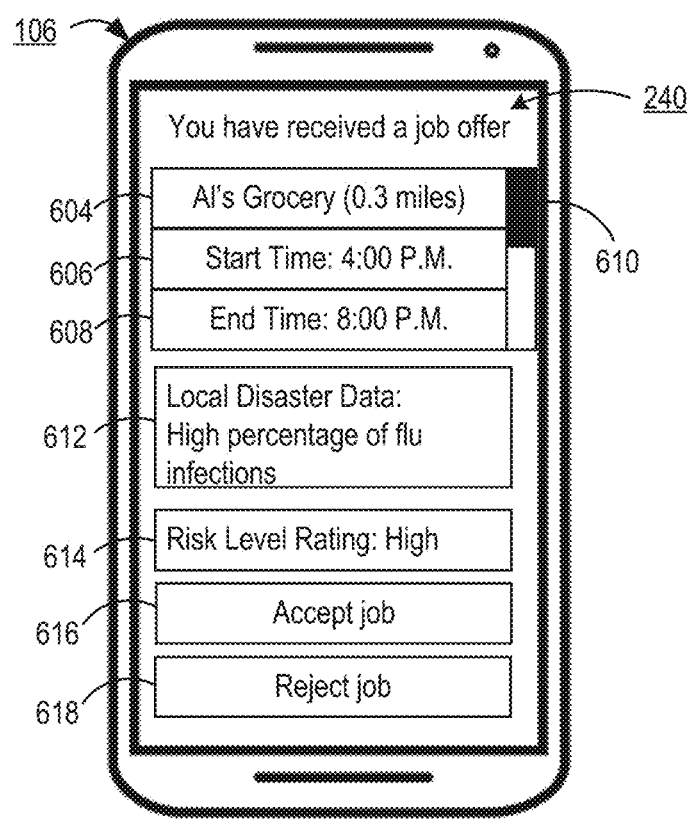
FIG. 6 is an illustration of some aspects of a user interface for accepting or rejecting a job on a user computing device, according to an example arrangement.

Referring to FIG. 6, is an illustration of some aspects of a user interface for accepting or rejecting a job on a user computing device, according to an example arrangement. The user computing device may be a worker computing device 106. The user interface may include the work matching application 240 and/or transaction information which may be directed to accepting or rejecting a job. The transaction information may include a location and distance of the job 604, a job start time 606, a job end time 608, a scrolling bar 610, a local disaster data statement 612, a risk level rating 614, an option to accept the job 616, and an option to reject the job 618. The distance of the job 604 is determined by comparing the GPS location of the worker computing device 106 to the location of the job. The user of the worker computing device 106 may utilize the scrolling bar 610 to view additional information for the job. In some embodiments, the worker may use the user interface described herein to specify an individual risk level (e.g., whether the worker will work only outdoors, whether the worker will work only if the business provides particular personal protective equipment (PPE) rated at or above a predetermined safety level (e.g., an N95 respirator or higher), etc.). Once the user of the worker computing device 106 makes a decision, they may utilize the option to accept the job 616 or the option to reject the job 618. Accepting or rejecting the job offer results in the response being sent to the provider institution computing system 102.

Figure 7:
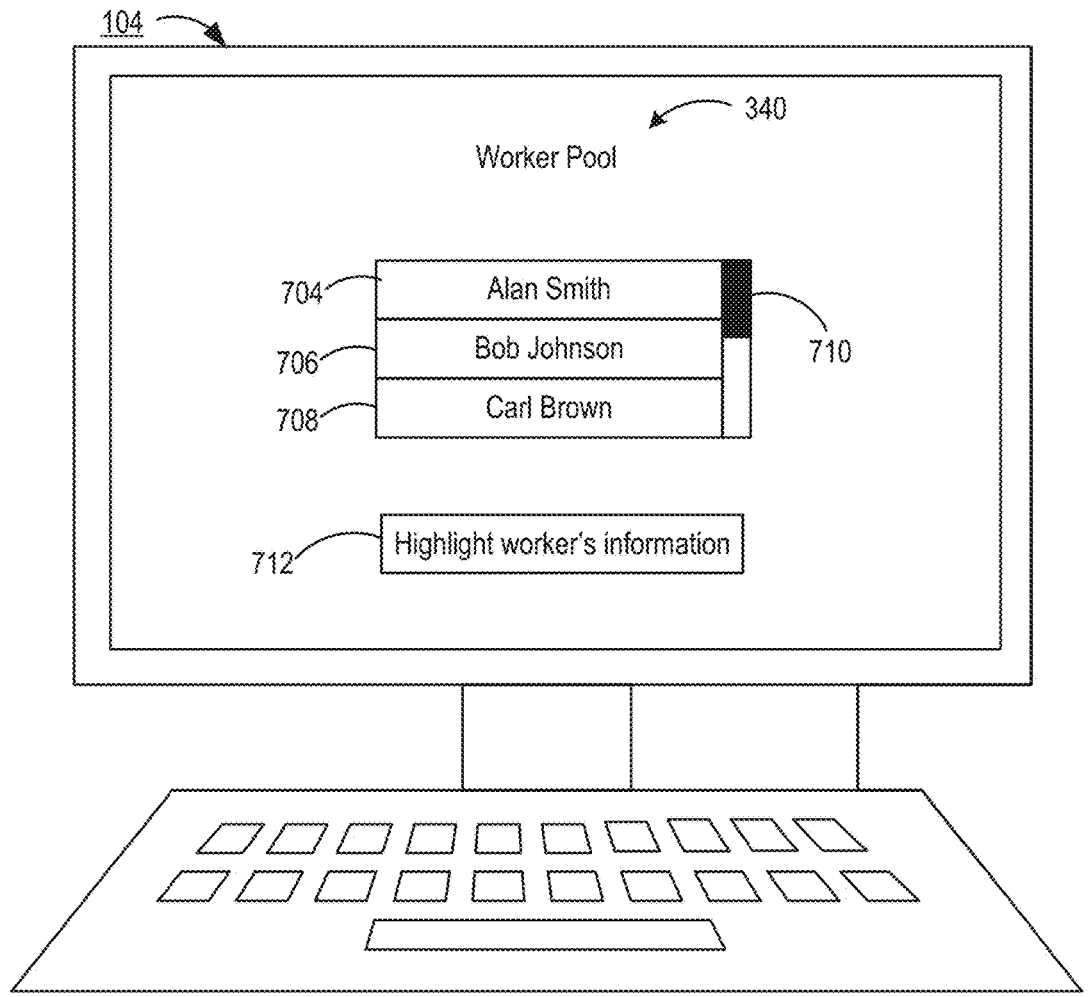
FIG. 7 is an illustration of some aspects of a user interface on the subscriber computing device for selecting from a worker pool, according to an example arrangement.

Referring to FIG. 7, is an illustration of some aspects of a user interface on the subscriber computing device 104 for selecting from a worker pool, according to an example arrangement. The subscriber computing device 104 user interface may display the work matching application 340 and/or transaction information which may be directed to selecting from a worker pool. The transactional information may include a first worker 704, a second worker 706, a third worker 708, a scrolling bar 710, and an option to highlight worker's information 712. The user of the subscriber computing device 104 may utilize the scrolling bar 710 to view additional workers. The user of the subscriber computing device 104 may select a worker's name and then view more information for that worker by selecting highlight worker's information 712.

Figure 8:
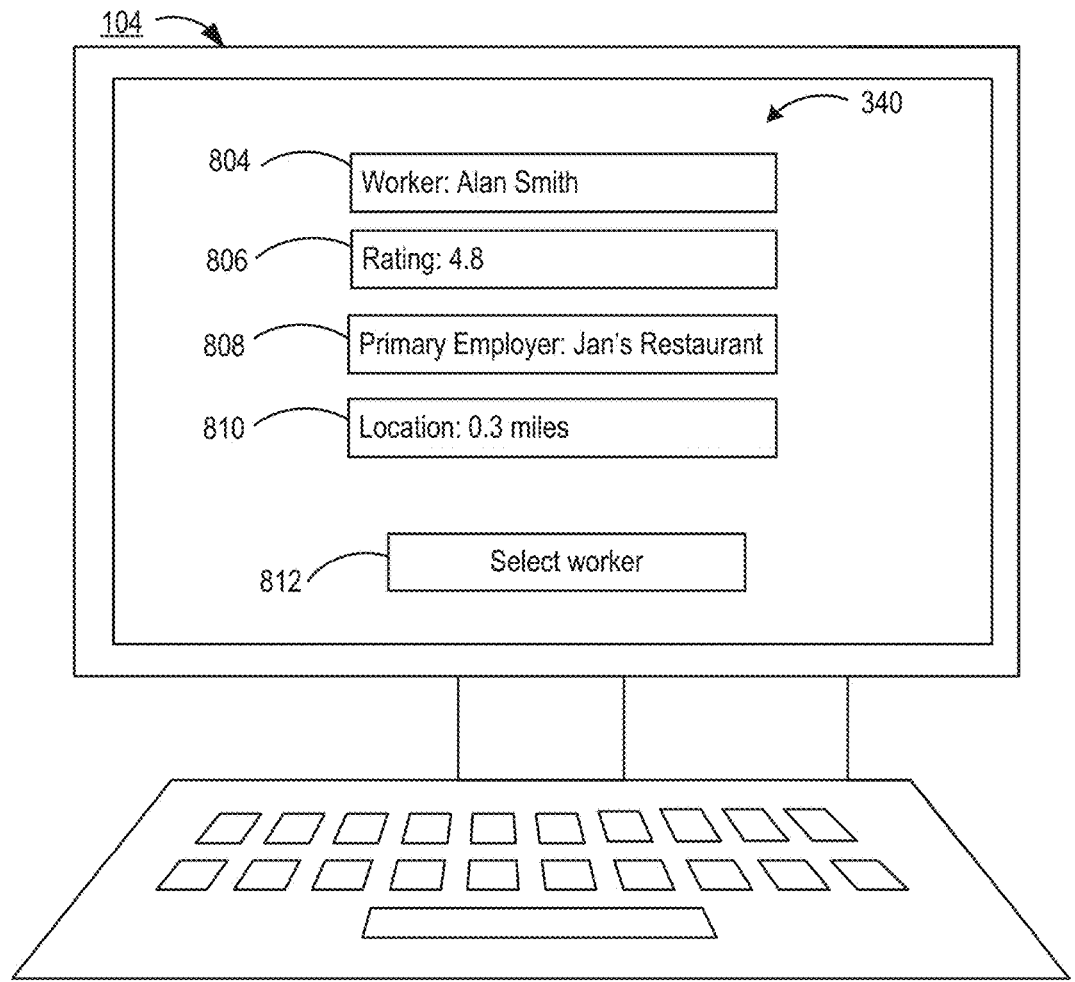
FIG. 8 is an illustration of some aspects of a user interface on the subscriber computing device for receiving information for a worker from a worker pool, according to an example arrangement.

Referring to FIG. 8, is an illustration of some aspects of a user interface on the subscriber computing device 104 for receiving information for a worker from a worker pool, according to an example arrangement. If the user of the subscriber computing device 104 selects to highlight a worker's name (e.g., as illustrated in FIG. 7), the subscriber computing device 104 user interface may display the work matching application 340 and/or transaction information which may be directed to viewing additional information for a selected worker from the worker pool. The transaction information may include a worker's name 804, a worker's rating value, 806, a worker's primary employer 808, a worker's current location 810, and a select control structure to a select a worker 812. The user of the subscriber computing device 104 may also provide additional information to the selected workers. If the user of the subscriber computing device 104 selects the worker, it may result in the selection being sent to the provider institution computing system 102.

Figure 9:
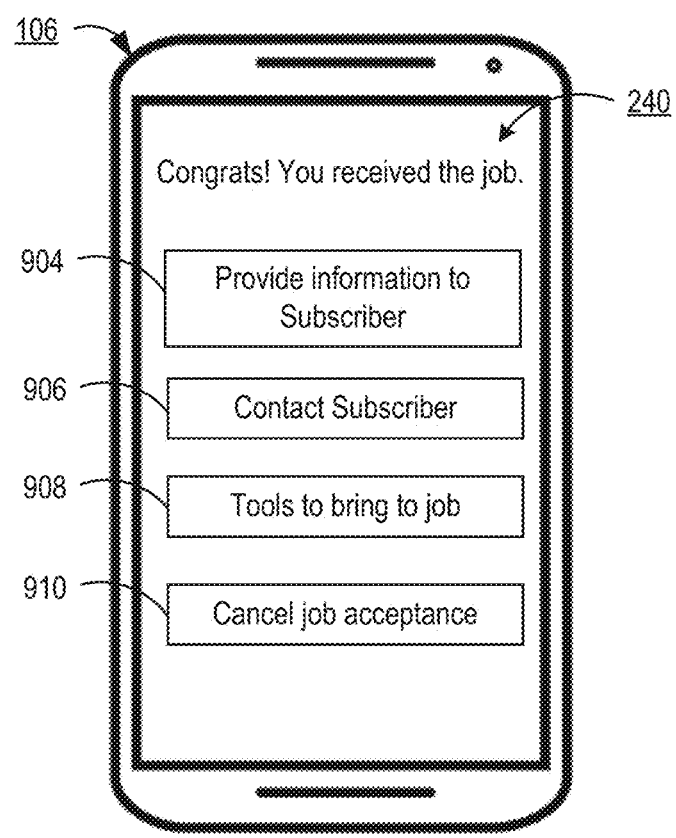
FIG. 9 is an illustration of some aspects of a user interface on a user computing device notifying the worker they have been selected and to provide the worker additional information, according to an example arrangement.

Referring to FIG. 9, is an illustration of some aspects of a user interface on the user computing device, notifying the worker they have been selected and to provide the worker additional information, according to an example arrangement. The worker computing device 106 user interface may display the work matching application 240 and/or transaction information which may be directed to inform the selected worker and to provide information to the subscriber. The transactional information may include an option to provide information to the subscriber 904, an option to contact the subscriber 906, tools to bring to the job 908, and an option to cancel the job acceptance 910. If the user of the worker computing device 106 selects to cancel the job acceptance, it will transmit a response to the provider institution computing system 102.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the embodiments might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and embodiment of the embodiments without departing from the scope of the present disclosure as expressed in the appended claims.

What is claimed is:

1. A computing system for matching a job to a plurality of workers in a business syndicate, comprising:
   a user device associated with a worker from the plurality of workers;
   a provider computing system comprising a network interface and a processing circuit, the network interface structured to facilitate data communication with the user device via a network, the processing circuit comprising a processor and a memory, the processing circuit structured to:
      receive an electronic request, the electronic request comprising a first data set related to the job;
      based on the first data set, generate a local disaster data set and a test requirement data set;
      cause a client application deployed to the user device to request an image file of a document, the image file of the document comprising a test result;
      receive the image file of the document from a camera;
      perform optical character recognition (OCR), using an OCR-parser, on the image file of the document to extract a worker identifier and a test result related to the worker identifier while automatically discarding sensitive information, by a redacting circuit, in the image file for the worker to prevent the computing system from storing the sensitive information, wherein the test result includes a disease tested for, a test date, a test status, and a confidence level;
      generate a test result data set;
      verify the test result data set satisfies the test requirement data set;
      receive a second data set related to the plurality of workers in the business syndicate;
      based on the second data set, generate a location data set and an availability data set;
      select at least one worker from the plurality of workers based on the location data set and the availability data set, the at least one worker associated with the user device;
      transmit a first electronic notification including at least in part the first data set related to the job and an opportunity to accept the job to the user device;
      cause the client application deployed to the user device to display the first electronic notification comprising at least in part the first data set related to the job, a risk level rating indicative of a likelihood of a health risk to the at least one worker based on epidemiological information of a location associated with the job, a risk level pay premium corresponding to the risk level rating, and an accept control structured to allow the worker to accept the job;
      receive an acceptance of the job from the user device; and
      transmit to a plurality of user devices associated with the plurality of workers a second electronic notification comprising an electronic indication that the job is no longer available.

2. The computing system of claim 1, wherein the processing circuit of the provider computing system is further structured to generate a background data set and a skill data set based on the second data set.

3. The computing system of claim 2, wherein the processing circuit of the provider computing system is further structured to update the skill data set for the worker based on the first data set following a completion of the job by the worker.

4. The computing system of claim 1, wherein the processing circuit of the provider computing system is further structured to generate a rating value for the worker based on the second data set.

5. The computing system of claim 4, wherein the processing circuit of the provider computing system is further structured to update the rating value for the worker based on a job rating value provided by a subscriber following a completion of the job.

6. The computing system of claim 4, wherein the processing circuit of the provider computing system is further structured to:
transmit the location data set and the rating value for the worker to a subscriber computing device associated with a subscriber of the business syndicate; and
cause the client application deployed to the subscriber computing device to display an electronic notification comprising at least in part the rating value and the location data set for the plurality of workers and a select control structured to allow the subscriber to select from the plurality of workers.

7. The computing system of claim 1, wherein the processing circuit of the provider computing system is further structured to generate a tax form, the tax form comprising information regarding the worker.

8. The computing system of claim 1, wherein the processing circuit of the provider computing system is further structured to transmit an electronic payment from a subscriber financial account to a financial account associated with the worker.

9. The computing system of claim 1, wherein the processing circuit of the provider computing system is further structured to transmit an electronic payment from a subscriber financial account to an escrow account associated with the business syndicate.

10. The computing system of claim 9, wherein the processing circuit of the provider computing system is further structured to transmit the electronic payment from the escrow account to a financial account associated with the worker.

11. The computing system of claim 1, wherein the processing circuit of the provider computing system is further structured to generate the location data set based on coordinates provided by a global positioning system (GPS) sensor on the user device.

12. The computing system of claim 1, wherein the risk level rating is based on the local disaster data set.

13. A method for matching a job to a plurality of workers in a business syndicate, comprising:
receiving, by a provider institution computing system via a network, an electronic request, the electronic request comprising a first data set related to the job;
receiving, by the provider institution computing system via the network, the first data set related to the job;
based on the first data set, generating, by the provider institution computing system, a local disaster data set and a test requirement data set;
causing, by the provider institution computing system via the network, a client application deployed to a user device associated with a worker, to request an image file of a document, the image file of the document comprising a test result;
receiving, by the provider institution computing system via the network, the image file of the document from a camera;
performing, by the provider institution computing system, optical character recognition (OCR), using an OCR-parser, on the image file of the document to extract a worker identifier and a test result related to the worker identifier while automatically discarding sensitive information, by a redacting circuit, in the image file for the worker to prevent the provider institution computing system from storing the sensitive information, wherein the test result includes a disease tested for, a test date, a test status, and a confidence level;
generating, by the provider institution computing system, a test result data set;
verifying, by the provider institution computing system, the test result data set satisfies the test requirement data set;
receiving, by the provider institution computing system via the network, a second data set related to the plurality of workers in the business syndicate;
based on the second data set, generating, by the provider institution computing system, a location data set and an availability data set;
selecting, by the provider institution computing system, at least one worker from the plurality of workers based on the location data set and the availability data set, the at least one worker associated with the user device;
transmitting, by the provider institution computing system via the network, a first electronic notification including at least in part, the first data set related to the job and an opportunity to accept the job to the user device;
causing, by the provider institution computing system via the network, the client application deployed to the user device, to display the first electronic notification comprising at least in part the first data set related to the job, a risk level rating indicative of a likelihood of a health risk to the at least one worker based on epidemiological information of a location associated with the job, a risk level pay premium corresponding to the risk level rating, and an accept control structured to allow the worker to accept the job;
receiving, by the provider institution computing system via the network, an acceptance of the job from the user device; and
transmitting, by the provider institution computing system via the network, to a plurality of user devices associated with the plurality of workers a second electronic notification comprising an electronic indication that the job is no longer available to a remaining selected plurality of workers.

14. The method of claim 13, further comprising generating, by the provider institution computing system, a rating value for the worker based on the second data set.

15. The method of claim 14, further comprising:
transmitting, by the provider institution computing system via the network, the location data set and the rating value for the worker to a subscriber computing device associated with a subscriber of the business syndicate; and
causing, by the provider institution computing system via the network, the client application deployed to the subscriber computing device, to display an electronic notification comprising at least in part the rating value and the location data set for the plurality of workers and a select control structured to allow the subscriber to select from the plurality of workers.

16. The method of claim 13, wherein the risk level rating is based on the local disaster data set.

17. A non-transitory computer readable medium having computer-executable instructions embodied therein that, when executed by at least one processor of a computing system, cause the computing system to perform operations to match a job to a plurality of workers in a business syndicate, the operations comprising:
receiving an electronic request, the electronic request comprising a first data set related to the job;
receiving the first data set related to the job;

based on the first data set, generating a local disaster data set and a test requirement data set;

causing a client application deployed to a user device to request an image file of a document, the image file of the document comprising a test result;

receiving the image file of the document from a camera;

performing optical character recognition (OCR), using an OCR-parser, on the image file of the document to extract a worker identifier and a test result related to the worker identifier while automatically discarding sensitive information, by a redacting circuit, in the image file for a worker to prevent the computing system from storing the sensitive information, wherein the test result includes a disease tested for, a test date, a test status, and a confidence level;

generating a test result data set;

verifying the test result data set satisfies the test requirement data set;

receiving a second data set related to the plurality of workers in the business syndicate;

based on the second data set, generating a location data set and an availability data set;

selecting at least one worker from the plurality of workers based on the location data set and the availability data set, the at least one worker associated with the user device;

transmitting a first electronic notification including at least in part, the first data set related to the job and an opportunity to accept the job to the user device;

causing the client application deployed to the user device to display the first electronic notification comprising at least in part the first data set related to the job, a risk level rating indicative of a likelihood of a health risk to the at least one worker based on epidemiological information of a location associated with the job, a risk level pay premium corresponding to the risk level rating, and an accept control structured to allow the worker to accept the job;

receiving an acceptance of the job from the user device; and transmitting to a plurality of user devices associated with the plurality of workers, a second electronic notification comprising an electronic indication that that the job is no longer available to a remaining selected plurality of workers.

18. The non-transitory computer readable medium of claim 17, the operations further comprising generating a rating value for the worker based on the second data set.

19. The non-transitory computer readable medium of claim 18, the operations further comprising:

transmitting the location data set and the rating value for the worker to a subscriber computing device associated with a subscriber of the business syndicate; and causing the client application deployed to the subscriber computing device, to display a third electronic notification comprising at least in part the rating value and the location data set for the plurality of workers, and a select control structured to allow the subscriber to select from the plurality of workers.

20. The non-transitory computer readable medium of claim 17, wherein the risk level rating is based on the local disaster data set.

* * * * *